United States Patent
Naphade et al.

(10) Patent No.: US 7,707,162 B2
(45) Date of Patent: Apr. 27, 2010

(54) METHOD AND APPARATUS FOR CLASSIFYING MULTIMEDIA ARTIFACTS USING ONTOLOGY SELECTION AND SEMANTIC CLASSIFICATION

(75) Inventors: Milind R. Naphade, Fishkill, NY (US); John Richard Smith, New Hyde Park, NY (US); Jelena Tesic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 11/620,838

(22) Filed: Jan. 8, 2007

(65) Prior Publication Data

US 2008/0168070 A1   Jul. 10, 2008

(51) Int. Cl.
 G06F 7/00 (2006.01)
 G06F 17/00 (2006.01)
(52) U.S. Cl. .................................. 707/103 R; 707/3
(58) Field of Classification Search ............. 707/1, 707/2, 6, 101, 102, 104.1; 382/131, 133, 382/265; 702/19
See application file for complete search history.

(56) References Cited

U.S. PATENT DOCUMENTS

| | | | |
|---|---|---|---|
| 6,115,718 A * | 9/2000 | Huberman et al. | 707/102 |
| 6,560,600 B1 * | 5/2003 | Broder | 707/7 |
| 6,675,159 B1 * | 1/2004 | Lin et al. | 707/3 |
| 6,724,933 B1 | 4/2004 | Lin et al. | |
| 7,124,149 B2 | 10/2006 | Smith et al. | |
| 2005/0057570 A1 | 3/2005 | Cosatto et al. | |
| 2006/0050933 A1 | 3/2006 | Adam et al. | |
| 2006/0294101 A1 | 12/2006 | Wneck | |
| 2007/0203996 A1 * | 8/2007 | Davitz et al. | 709/206 |

* cited by examiner

*Primary Examiner*—Apu M. Mofiz
*Assistant Examiner*—Susan Y Chen
(74) *Attorney, Agent, or Firm*—Yee & Associates, P.C.; Kenneth R. Corsello

(57) ABSTRACT

A method and apparatus is provided for automatically classifying a multimedia artifact based on scoring, and selecting the appropriate set of ontologies from among all possible sets of ontologies, preferably using a recursive routing selection technique. The semantic tagging of the multimedia artifact is enhanced by applying only classifiers from the selected ontology, for use in classifying the multimedia artifact, wherein the classifiers are selected based on the context of the multimedia artifact. One embodiment of the invention, directed to a method for classifying a multimedia artifact, uses a specified criteria to select one or more ontologies, wherein the specified criteria indicates the comparative similarity between specified characteristics of the multimedia artifact and each ontology. The method further comprises scoring and selecting one or more classifiers from a plurality of classifiers that respectively correspond to semantic element of the selected ontologies, and evaluating the multimedia artifact using the selected classifiers to determine a classification for the multimedia artifact.

30 Claims, 4 Drawing Sheets

METHOD AND APPARATUS FOR CLASSIFYING MULTIMEDIA ARTIFACTS USING ONTOLOGY SELECTION AND SEMANTIC CLASSIFICATION

BACKGROUND OF THE INVENTION

1. Field of the Invention

The invention disclosed and claimed herein generally pertains to selection of resources from among various methods of automatic content tagging in large scale systems. More particularly, the invention pertains to a method and apparatus for automatically classifying multimedia artifacts by scoring and selecting appropriate ontologies from amongst all possible sets of ontologies, such as by recursive routing selection. Even more particularly, the invention pertains to a method of the above type wherein the semantic tagging of the multimedia artifact is improved, or enhanced by applying only classifiers selected from the selected ontologies, based on the context of the multimedia artifact.

2. Description of the Related Art

Vast amounts of multimedia content are being created in many areas of science and commerce, necessitating the need for new automatic data analysis and knowledge discovery tools for more efficient data management. Semantic classification algorithms are being developed for classification to add metadata and facilitate semantic search. A principal challenge in semantic content modeling is the complexity of the modeled domain. Projecting multimedia content into a high-dimensional semantic space requires a suitable set of semantic classifiers that effectively and efficiently capture the underlying semantics of the data stream. Classifiers are often mapped to classes belonging to a specific ontology and specific domain, such as Broadcast News Video, Surveillance Video, Medical Imaging, Personal Photos, and the like.

As processing power increases and data size increases exponentially, the number of classes that need to be detected, and can be detected, is also increasing considerably. Moreover, as the number and variety of automatic content classifiers increases, so does the entropy or randomness of the respective analysis system. Evaluating thousands of existing semantic concepts against terabytes of data is computationally expensive and redundant, and results in a computational bottleneck, or in an increased need for human experts who can select the appropriate set of classifiers to be automatically evaluated against a content item. Adding automatic classifiers results in a less efficient and less effective system, if the proper context of the automatic tagging is not included. At present, no solution exists for efficient traversing through the set of existing ontologies, and for the smart selection of classifiers associated with the respective ontologies in order to accommodate a large scale of classifiers and data. Moreover, automatic classifiers for the same class can differ significantly in the context of different ontologies;, for example, Person Activity in Surveillance Videos versus Person Activity in Broadcast News. The known solutions for selecting the most appropriate classifiers either adopt (or build) a single ontology, or else evaluate against a manually selected set of concepts within all available ontologies. This can compromise the quality of the content retrieval, since weak and redundant classifiers can have the same relevance in the semantic tagging as the more reliable ones.

In recent years, a substantial amount of effort has been put into designing semantic concept detectors for various concepts of interest in different domains. The "Large Scale Concept Ontology for Multimedia" *IEEE Trans. Multimedia*, July 2006, initiative has identified nearly 1000 concepts of interest for visual analysis. For example, Kender and Naphade, in "Visual concepts for news story tracking: Analyzing and exploiting the NIST TRECVID video annotation experiment," *IEEE Proc. Int. Conf. Computer Vision and Pattern Recognition (CVPR)*, 2005, exploited the relationships between concepts, and used various criteria to determine the maturity of LSCOM concept definition and ontology completeness. Also, performance of semantic classifiers can be enhanced using context, as shown on a moderate-size lexicon by Naphade and Smith in "Mining the Semantics of Concepts and Context," *Intl. Workshop on Multimedia Data Management* (MDM-KDD), 2003. However, ontologies offer varying interpretations of concepts when used within context.

Moreover, analysis of vast amounts of image and video data available on internet blogs and web chat rooms has produced a need to analyze multiple modalities such as associated text, audio, speech, URL and XML data. This type of data is needed to automatically place a multimedia artifact in a context, and to offer clues that will result in correct ontology selection. For example, Benitez, Smith, and Chang introduced a multimedia knowledge representation framework of semantic and perceptual information in "MediaNet: A Multimedia Information Network for Knowledge Representation", *Proc. SPIE* 2000 *Conference on Internet Multimedia Management Systems* (IS&T/SPIE-2000), Vol. 4210, 2000.

Reconciling ontology entries to create a normalized omniscient ontology may be virtually impossible. Thus, choosing the right set of ontologies, and the right set of classifiers for a multimedia artifact is one of the key problems in regard to large simultaneous information feeds of video streams that need to be analyzed and indexed. Statistical approaches to determine both classifiers and ontologies simultaneously need exhaustive evaluation and pruning in order to make an ontology manageable for a large number of classes.

In the absence of a solution that addresses the above situation, selecting the right set of classifiers for multimedia artifacts that are based on the appropriate context and determined by the appropriate ontologies in a large scale classification system, will continue to be a problem.

SUMMARY OF THE INVENTION

The invention generally pertains to a method and apparatus for automatically classifying a multimedia artifact based on scoring, and selecting the appropriate set of ontologies from among all possible sets of ontologies, preferably using a recursive routing selection technique. The semantic tagging of the multimedia artifact is enhanced by applying only classifiers from the selected ontology, for use in classifying the multimedia artifact, wherein the classifiers are selected based on the context of the multimedia artifact. One embodiment of the invention, directed to a method for classifying a multimedia artifact, uses a specified criteria to select one or more ontologies, wherein the specified criteria indicates the comparative similarity between specified characteristics of the multimedia artifact and specified characteristics of each ontology. The method further comprises scoring and selecting one or more classifiers from a plurality of classifiers that respectively correspond to semantic elements of the selected ontologies at the current granularity, and evaluating the multimedia artifact using the selected classifiers to determine a classification for the multimedia artifact. This is a recursive process, so scoring and selecting happens at every level of the hierarchy as traversing through the ontology continues. So, at every level, semantic characteristics differ (e.g. sports concept at one level, and scoring a goal at the next). One objective of the invention is to provide a method for selecting the most appropriate set of classifiers and/or ontology based on context, and to optimize the number of concepts that can be evaluated on a large collection without compromising the metadata enrichment or increasing the processing complexity. Further objectives are to select classification detectors on the basis of multimodal observations of the data, and to describe each classification method and ontology in terms of characteristics such as domain, quality and size. It is anticipated that embodiments of the invention will provide suboptimal metadata enrichment of multimedia artifacts for arbitrary dataset size, computation and processing constraints.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
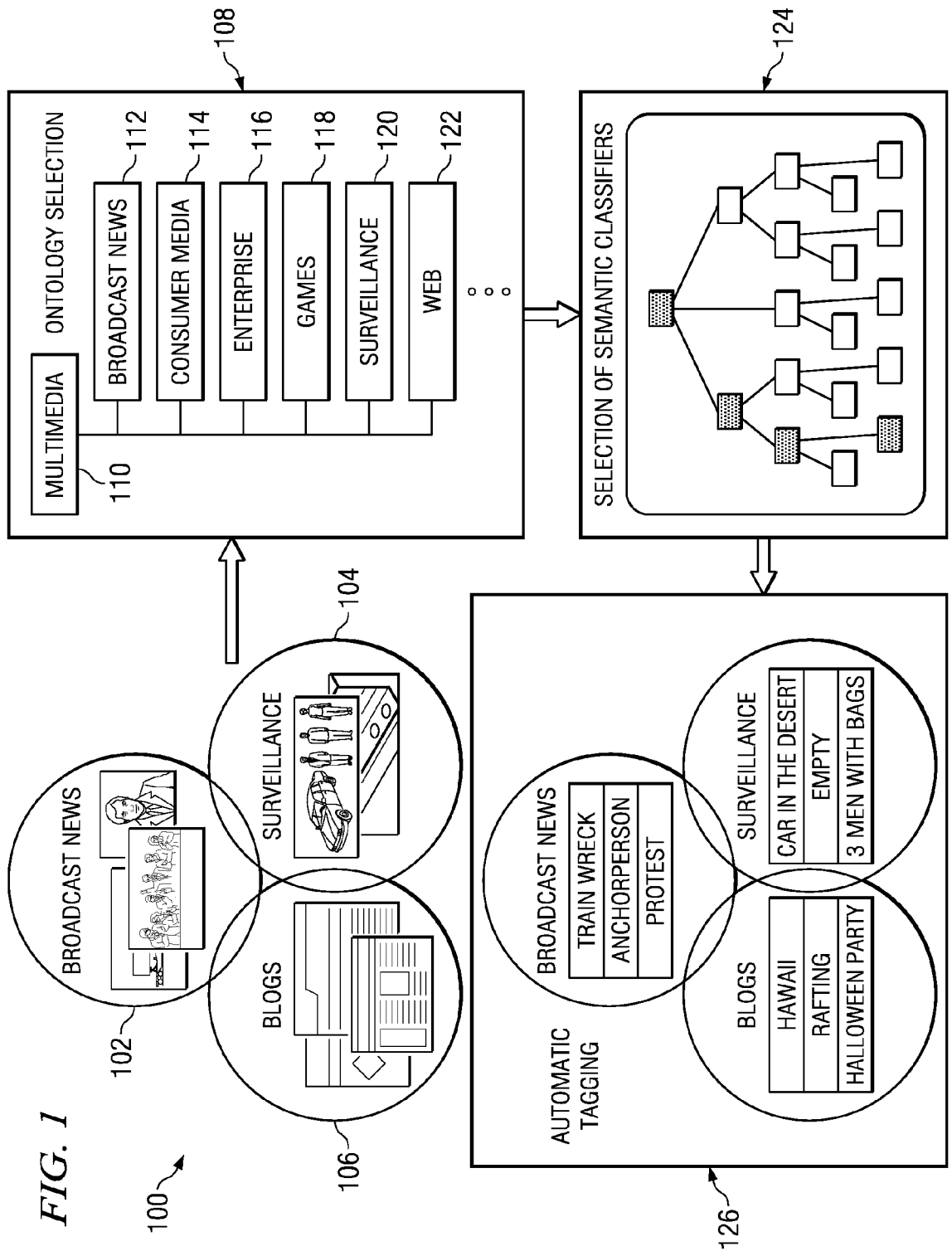
FIG. 1 is a schematic drawing depicting an ontology and semantic-based metadata concept selection pipeline, for use in illustrating concepts of the invention.

Referring to FIG. 1, there is shown a large scale classification system 100 for use in an embodiment of the invention. The system is configured to perform semantic tagging and classification of multimedia information that is provided by specified information sources. FIG. 1 shows examples of such information sources, such as a Broadcast News source 102 that provides video information, Surveillance source 104 that provides video and raw archive images, and Blogs or other Internet sources 106 that provide personal images and photographs.

As a first stage or step in the classification procedure described herein, it is necessary to select an ontology for the particular multimedia information, from all the ontologies that are available or pertinent to the particular information. This is shown by ontology selection stage 108 of FIG. 1. As is known by those of skill in the computer science and information science arts, an ontology is a data model that has an associated domain, and that is used to reason about objects in the domain and relations between objects. In addition to individual objects in its domain, an ontology has classes, which are sets, collections or different types of objects. An ontology also has associated attributes and semantic elements, where attributes are properties, features, characteristics or parameters that domain objects can have. Semantic elements of an ontology can be generic or specific entities, and can include, by way of example and not limitation, particular events, objects, activities, scenes, sites, people and/or organizations.

In FIG. 1, a data object comprising information furnished by one of the sources 102-106, wherein the object is in digital form and is to be classified and tagged by system 100, is referred to hereinafter as a multimedia artifact. Examples of multimedia artifacts, as such term is used herein, include but are not limited to photographs, graphics, images, videos, audio, music, text, three dimensional objects, games, virtual worlds, XML, and/or other structured and unstructured information. A multimedia artifact is also characterized by semantic elements similar to the semantic elements associated with ontologies, as described above. In the system of FIG. 1, metadata pertaining to a given multimedia artifact can be used to select an ontology from the available ontologies that correspond to the given multimedia artifact. Examples of metadata, for a particular multimedia artifact, could include, without limitation, the artifact source, its image name, alt tag, attribute, the name of the collection to which the artifact belongs, and/or its general purpose.

A further important characteristic of ontologies is that they may occur in a structure wherein there may be multiple ontologies that are horizontal, or on the same level. There may also be ontologies that are on different levels. For example, FIG. 1 shows the ontology Multimedia 110, which is on a level above ontologies 112-122. Thus, if the Multimedia ontology 110 is selected in classifying a multimedia artifact, one or more of the ontologies 112-122 may also be selected to further refine artifact classification.

Referring further to FIG. 1, after an ontology has been selected, semantic classifiers are also selected, at stage 124 of FIG. 1. In the classification procedure, semantic elements of a multimedia artifact are compared with semantic elements included in a selected ontology domain, in order to detect matches therebetween. A classifier is a mechanism that automatically routes this procedure down through the taxonomy, or classification structure of the ontology. Thus, if a match occurs with an ontology semantic element, and the element is a node that has a branch descending downwards or has leaves at a lower level, a classifier corresponding to the semantic element will direct the matching procedure down the branch to check for matches at lower levels. In carrying out this activity, the classifier may make use of algorithms, wherein the algorithms can use, without limitation, rule-based, statistical-based or hybrid classification methods. Such algorithms include, but are not limited to, neural networks, decision trees, Gaussian mixture models, hidden Markov models and support vector machines. These algorithms can use models developed to recognize, or identify semantic elements.

As used herein, the term "evaluating a multimedia artifact", means carrying out a comparison or classification procedure as described above. As the classifiers route the multimedia artifact through the classes of a selected ontology or ontologies, underlying semantics of the artifact are captured. That is, when matches occur between semantic elements of the multimedia artifact and those of the ontology classes, new metadata is discovered for the artifact. As a result, the multimedia artifact is automatically enriched with the most relevant metadata, which can pertain to both its context and its content. This enriching metadata can be used to tag the multimedia artifact, as shown by the automatic tagging stage 126 of FIG. 1. Enriched semantic metadata can be packaged with the multimedia artifact, or stored in an associated database.

If there are multiple ontologies on the top level to be considered for a multimedia artifact, one or more of the ontologies is initially selected on the basis of some criteria. The selection can be based on context information, or other metadata for the multimedia artifact, if available. If metadata does not exist, the pertinence of each ontology is scored, based on artifact content, and the ontology or ontologies with the highest scores are selected. If there are multiple classifiers in the selected ontologies, the classifiers can also be scored to select those that are most pertinent to the multimedia artifact. The scoring activity can be carried out in connection with algorithms such as those referred to above.

Figure 2:
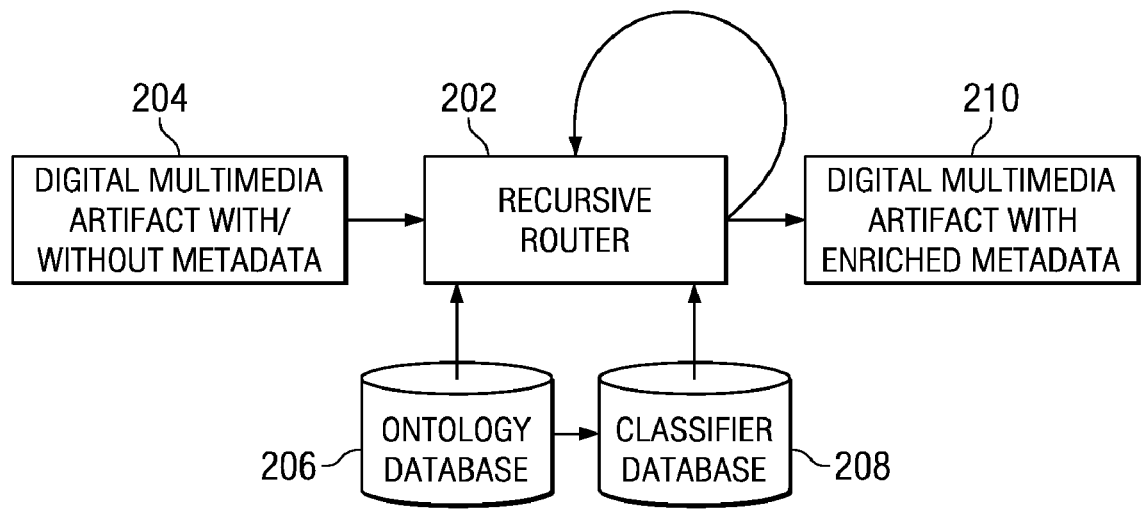
FIG. 2 is a block diagram showing a recursive router and other components for use in carrying out embodiments of the invention.

Referring to FIG. 2, there is shown a recursive router 202 configured with other components that can be operated collectively to carry out classification and tagging procedures for system 100, as described above. Initially, a digital multimedia artifact 204 is inputted to router 202, with or without metadata, and the artifact is recursively evaluated. If there is no metadata available, the multimedia artifact is classified only on the basis of its content, as likewise described above. Otherwise, the metadata is used in the classification.

During successive recursions, the multimedia artifact is evaluated with respect to different ontologies from ontology database 206. Router 202 derives a score for each ontology, based on the number of semantic elements from the ontology that are found to match, or be relevant to the, multimedia artifact. The scores of respective ontologies are ranked, and the ranking is used to select the ontology, or ontologies that are most appropriate to the multimedia artifact. Classifiers associated with the selected ontologies are then selected, from a classifier database 208, based on the content and/or metadata of the multimedia artifact. The selected classifiers are used to evaluate the artifact, and scores are derived for the classifiers and ranked in like manner as the ontologies. The classification scores, together with existing metadata, are used to further refine traversal through the ontology structure for a set of classifiers to be evaluated during the subsequent cycle of recursive router 202. Iterative refinement of automatic semantic tagging stops, when prespecified leaves are reached in the ontology database 206.

Using the recursive router arrangement of FIG. 2, evaluation of a multimedia artifact traverses a path that reaches classes at different levels of the ontology class hierarchy. Thus, there can be integration at different levels of decision, to enhance or enrich semantic metadata. FIG. 2 further shows an output 210 comprising enriched metadata that is produced by the recursion process. The metadata can also be fed back to the recursive router, to further refine the next evaluation cycle.

Figure 3:
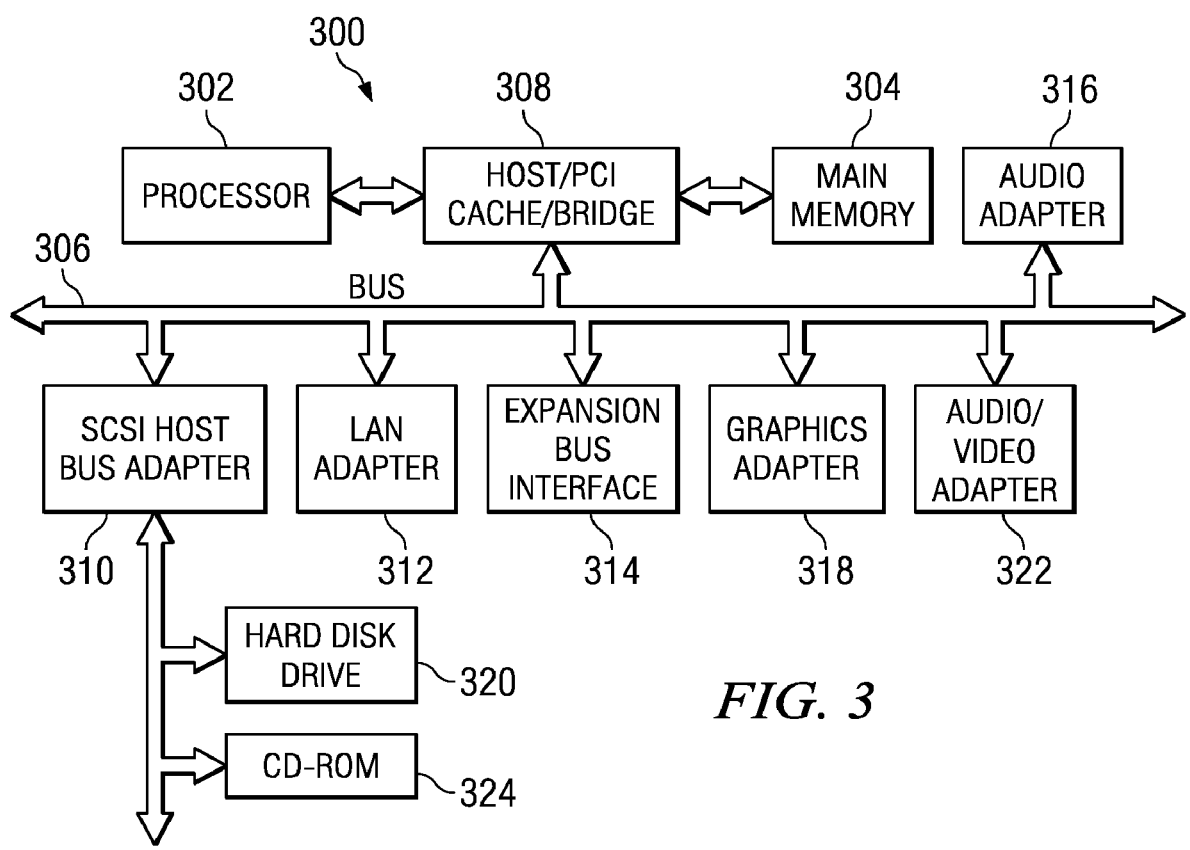
FIG. 3 is a block diagram showing a data processing system that may be used to implement the recursive router of FIG. 2, and other components in embodiments of the invention.

Referring to FIG. 3, there is shown a block diagram of a generalized data processing system 300 which may be adapted to provide recursive router 202 and other components shown in FIG. 2, as well as other components needed to implement embodiments of the invention described herein. It is to be emphasized, however, that the invention is by no means limited to such systems. For example, embodiments of the invention can also be implemented with a large distributed computer network and a service over the internet, as this can be applicable to distributed systems, LANs and WWWs.

Data processing system 300 exemplifies a computer, in which code or instructions for implementing embodiments of the invention may be located. Data processing system 300 usefully employs a peripheral component interconnect (PCI) local bus architecture, although other bus architectures such as Accelerated Graphics Port (AGP) and Industry Standard Architecture (ISA) may alternatively be used. FIG. 3 shows a processor 302 and main memory 304 connected to a PCI local bus 306 through a Host/PCI Cache bridge 308. PCI bridge 308 also may include an integrated memory controller and cache memory for processor 302. It is thus seen that data processing system 300 is provided with components that may readily be adapted to provide other components for implementing embodiments of the invention as described herein. Referring further to FIG. 3, there is shown a local area network (LAN) adapter 312, a small computer system interface (SCSI) host bus adapter 310, and an expansion bus interface 314 respectively connected to PCI local bus 306 by direct component connection. Audio adapter 316, a graphics adapter 318, and audio/video adapter 322 are connected to PCI local bus 306 by means of add-in boards inserted into expansion slots. SCSI host bus adapter 310 provides a connection for hard disk drive 320, and also for CD-ROM drive 324.

Figure 4:
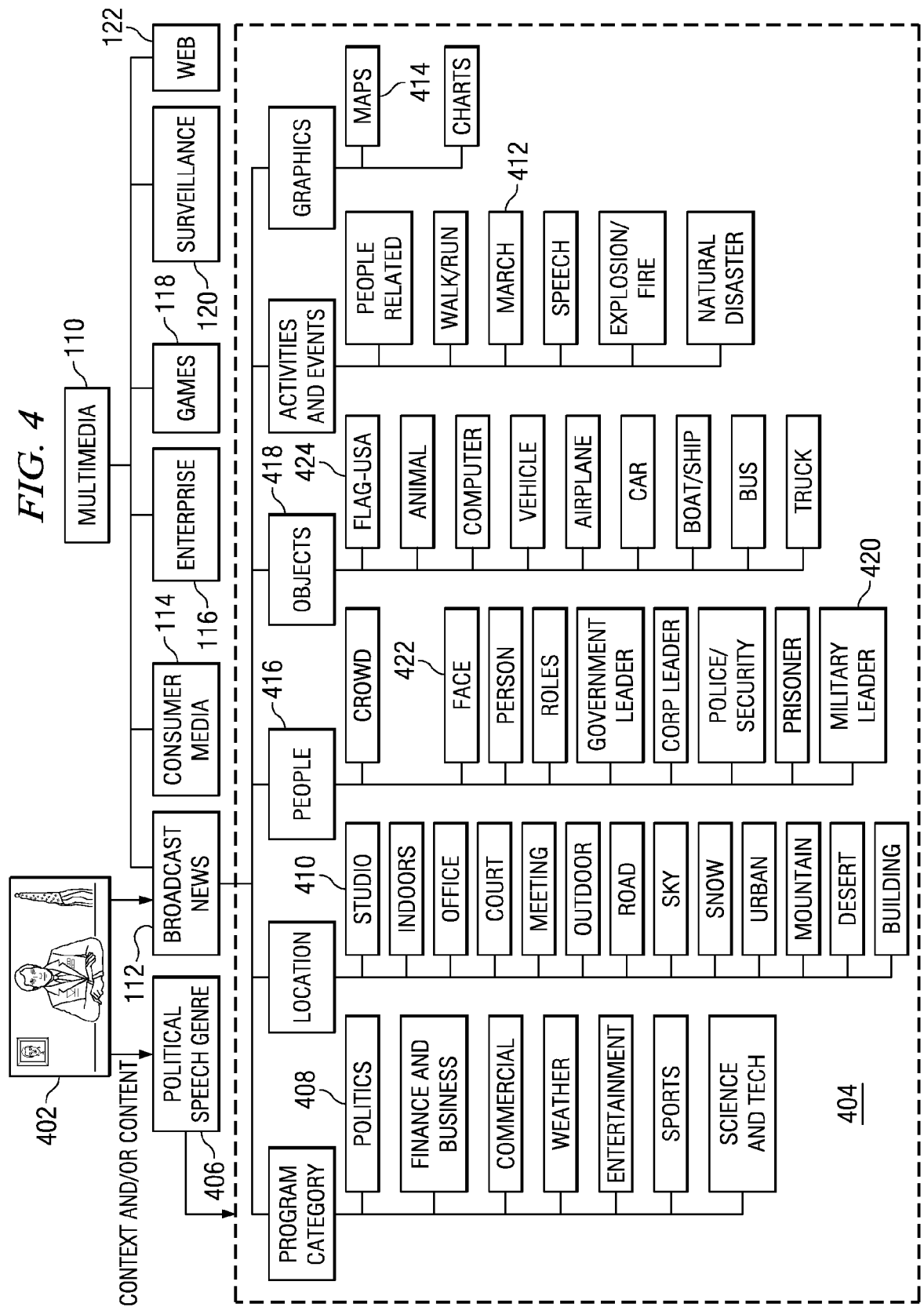
FIG. 4 is a schematic diagram showing one embodiment of the invention.

Referring to FIG. 4, there is shown an embodiment of the invention wherein only one level of an ontology structure is traversed, in carrying out an algorithm to automatically select semantic classifiers for use in evaluating a multimedia artifact. FIG. 4 shows a multimedia artifact comprising a photographic image 402 or the like, provided by Broadcast News source 102 as described above. Based on the source of artifact 402, Broadcast News ontology 112 is selected from among the available multimedia ontologies 108, that are shown in FIG. 1.

Referring further to FIG. 4, there is shown a set 404 of general semantic classifiers at node level, under the Broadcast News ontology 112, wherein set 404 comprises a superset of leaf classifiers. The genre for multimedia artifact 402 can be derived from such general semantic classifiers and from artifact context, such as the source and collection of multimedia artifact 402, and its associated metadata. FIG. 4 shows that by running the context, and/or content of multimedia artifact 402 against relevant genre classes, it can be determined that the political speech genre 406 is a genre for artifact 402. This determination triggers specific semantic classifier leaf nodes in set 404, including politics node 408 in the Program category, studio node 410 in the Location category, speech node 412 in the Activities and Events category and the maps node 414 in the Graphics category. Frequent concurrencies of high-level concepts can be used to trigger the most appropriate classifier nodes at each level of the ontology structure. More visual categories of the current analogy, such as the categories People 416 and Objects 418, are triggered as a whole set. Iterative refinement of the People and Object categories 416 and 418, at the level of the leaf classifiers of set 404, is based on classification detection scores. Only the classifier concept nodes with the highest detection scores at this level are selected, such as the military leader node 420, the face node 422, and flag node 424, as shown by FIG. 4.

The effort to provide the information shown by FIG. 4 describes one recursion in carrying out a classification procedure in accordance with the embodiment of the invention. There is only one recursion, since each of the classifier leaf nodes shown in FIG. 4 is an ontology that might overlap with other ontologies. Therefore, the system carrying out the classification recursively selects the appropriate ontology based on classification of artifact and associated meta content, against the classes at each iteration level or recursion level.

Figure 5:
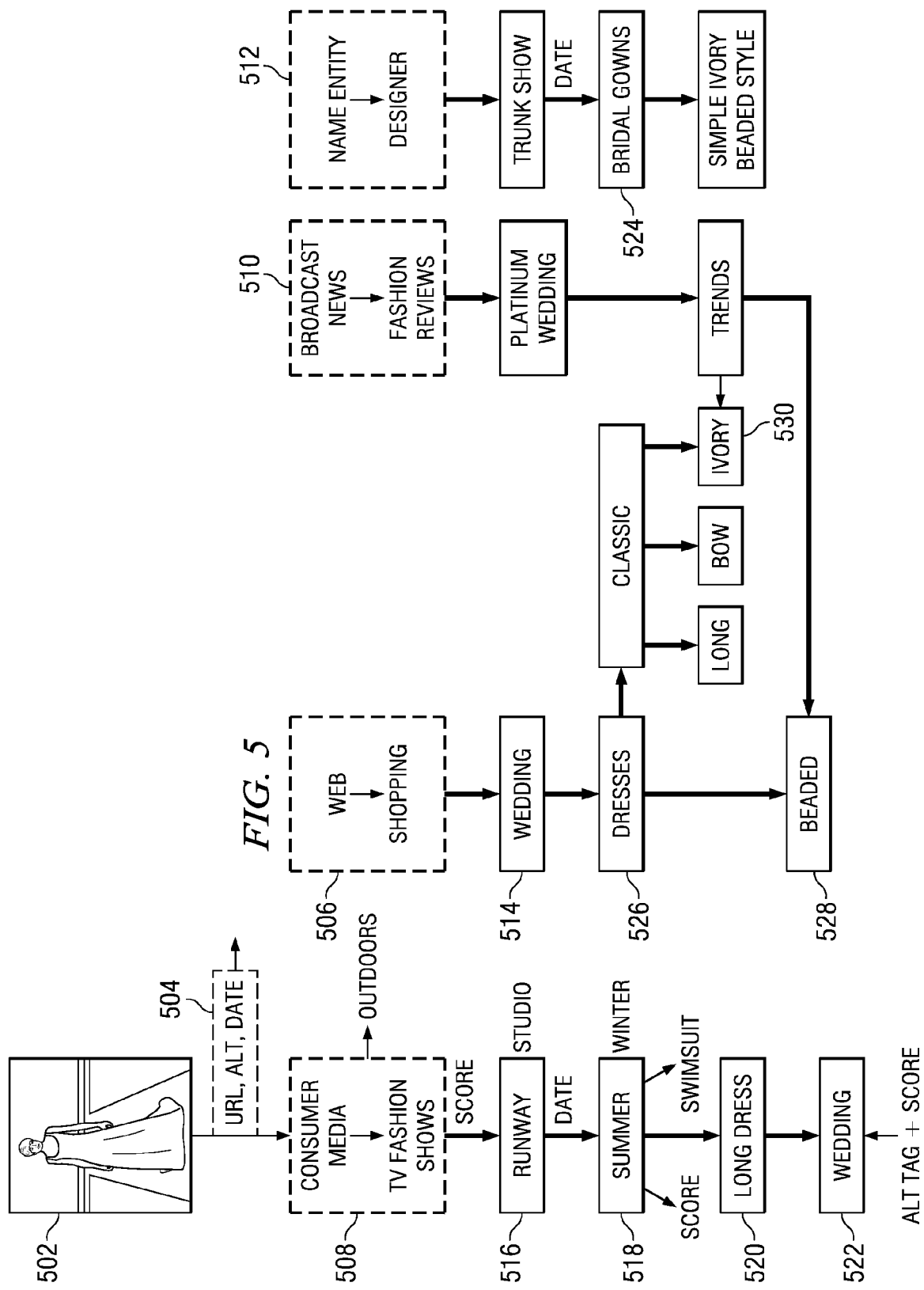
FIG. 5 is a schematic diagram showing another embodiment of the invention in the different domain.

Referring to FIG. 5, there is shown an example of how an image can be automatically tagged with semantic labels from different ontologies, without exhaustive evaluation against thousands of classifiers. A multimedia artifact comprising an image 502 has a URL, HTML address, file name, date it was taken, and alt tag as input metadata 504. The HTML address and alt tag select a Web Shopping ontology 506. A file name, page source from the URL and alt tag select the Consumer Media and TV Fashion Shows ontology 508, and Fashion Reviews in Broadcast News 510. The image name entity, detected in the page URL, triggers the Name entity ontology and a related Designer profession 512.

After selecting pertinent ontologies, the next step is to determine the relevant branch in each selected ontology, based on the existing metadata 504. Thus, Wedding branch 514 is selected from the Shopping Category 506, based on the alt tag. At the next level below Fashion Shows 508, scoring of the appropriate classifier is used to select Runway 516. The date of the image 502 is then used to select Summer 518, at the next following level. Classifier scoring is also used to select Long Dress 520, and a combination of alt tag and scoring is used to select the Wedding category 522.

The arrangement of FIG. 5, the result at each level, is used both for metadata enrichments and for finer classifier selection. Also, ontologies can have overlapping branches. An example of this is Bridal Gowns 524 of Designer ontology 512 overlapping in part with Wedding Dresses 526 of Shopping ontology 506. Moreover, FIG. 5 illustrates how branches or tags from different ontologies can reach the same category, such as the Beaded category 528 and the Ivory category 530.

In embodiments of the invention, the ontology structure can be leveraged to avoid detecting the entire lexicon by smartly selecting concept detectors that need to be run on the data. In one approach, the frequent concurrencies of high-level concepts are used to devise a scheme for sub-optimal choice of the most appropriate concepts to evaluate against a multimedia artifact or collection item based on a tradeoff measure between another of the number of concepts evaluated, and metadata enrichment. The subset of classifiers is iteratively evaluated against a data sample, and weights assigned to the classifiers in a training phase are adapted based on sample content.

The invention can take the form of an entirely software embodiment or an embodiment containing both hardware and software elements. In a preferred embodiment, the invention is implemented in software, which includes but is not limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device), or a propagation medium. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for classifying a multimedia artifact comprising:

applying a recursive routing selection technique to select said multimedia artifact as an input data object in digital form that is mapped by particular semantic classes which belong to a specific ontology and to a specific domain, including:

using specified criteria including an HTML address, an alt tag and a date-time limitation, to select at least one ontology from a plurality of ontology stored in an ontology database, wherein each ontology in the plurality of ontology includes an associated domain that is limited to said input data object, specified domain characteristics, and semantic classes, wherein said specified criteria indicates a comparative similarity between specified characteristics of said multimedia artifact and the specified domain characteristics of each ontology in the plurality of ontology;

scoring and selecting one or more classes from a plurality of classes to form selected classes that respectively correspond to the semantic classes of the selected ontology;

evaluating said multimedia artifact using said selected classes to determine a classification for said multimedia artifact, wherein automatic classification and tagging procedures are executed by a computer processor, which compares content and semantic metadata of said multimedia artifact with each of the selected classes of each ontology of the selected ontology, and is responsive to frequent concurrence of high level concepts which are used to derive a downward leaf object searching schema for suboptimal choice of the most appropriate concept to evaluate against said multimedia artifact, which results in recursively capturing new semantic metadata for refining said metadata of said multimedia artifact and rendering a new classification for said multimedia artifact;

stopping recursive routing when a pre-specified suboptimal downward leaf object searching schema is reached in said ontology database; and displaying said classified multimedia artifact to a user for facilitating end user search of a specific domain.

2. The method of claim 1, wherein:

said specified criteria is used to select the at least one ontologies from the plurality of ontologies located in a data structure, wherein the data structure comprises ontologies on horizontal levels and ontologies on different levels, and said specified criteria selectively comprises either metadata associated with said multimedia artifact, or ontology scores derived for each ontology in the plurality of ontologies that pertains to content information of said multimedia artifact.

3. The method of claim 1, wherein:

said evaluation using said selected classes enriches said multimedia artifact with said new semantic metadata, wherein said new semantic metadata is stored in a specified database, or packaged with said multimedia artifact, selectively.

4. The method of claim 2, wherein:
said ontology scores and class scores are each derived by analyzing context information related to said multimedia artifact, wherein said context information includes at least one element selected from a group of elements comprising time, place, content provider, person, event, object, scene and content acquisition parameters.

5. The method of claim 1, wherein:
said evaluating step comprises using said selected classes to detect the presence or absence of specified semantic elements that characterize said multimedia artifact.

6. The method of claim 5, wherein:
said selected classes are used in the automatic classification procedure that uses a method selected from a group of methods that includes at least neural networks, decision trees, Gaussian mixture models, hidden Markov models, and support vector machines.

7. The method of claim 1, wherein:
a recursive router is used with said multimedia artifact, to derive ontology scores and class scores, and to select the at least one ontology from the ontology database based on the ontology scores and relationship branches between ontologies and to select said selected classes from a class database based on the class scores and relationships branches between the semantic elements of the at least one ontology.

8. The method of claim 7, wherein:
said recursive router supplies said multimedia artifact with enriched metadata.

9. The method of claim 1, wherein:
the plurality of ontologies are scored and the at least one ontology is selected based on the number of semantic elements in the at least one ontology that are found to be relevant to said multimedia artifact.

10. The method of claim 9, wherein:
the relevance of the plurality of ontologies is determined by respectively selecting one or more semantic elements from the plurality of ontologies, and applying corresponding classes of the one or more semantic elements to said multimedia artifact.

11. A computer program product in a computer readable storage medium having instructions embodied therein for classifying a multimedia artifact comprising:
instructions for applying a recursive routing selection technique to select said multimedia artifact as an input data object in digital form that is mapped by particular semantic classes which belong to a specific ontology and to a specific domain, including;
instructions for using specified criteria including an HTML address, an alt tag and a date-time limitation, to select at least one ontology from a plurality of ontology stored in an ontology database, wherein each ontology in the plurality of ontology includes an associated domain that is limited to said input data object, specified domain characteristics, and semantic classes, wherein said specified criteria indicates a comparative similarity between specified characteristics of said multimedia artifact and the specified domain characteristics of each ontology in the plurality of ontology;
instructions for scoring and selecting one or more classes from a plurality of classes to form selected classifiers that respectively correspond to the semantic classes of the selected ontology;
instructions for evaluating said multimedia artifact using said selected classes to determine a classification for said multimedia artifact, wherein automatic classification and tagging procedures are executed by a computer processor, which compares content and semantic metadata of said multimedia artifact with each of the selected classes of each ontology of the selected ontology, and is responsive to frequent concurrence of high level concepts which are used to derive a downward leaf object searching schema for suboptimal choice of the most appropriate concept to evaluate against said multimedia artifact, which results in recursively capturing new semantic metadata for refining said metadata of said multimedia artifact and rendering a new classification for said multimedia artifact; and
instructions for stopping recursive routing when a pre-specified suboptimal downward leaf object searching schema is reached in said ontology database.

12. The computer program product of claim 11, wherein:
said specified criteria is used to select the at least one ontologies from the plurality of ontologies located in a data structure, wherein the data structure comprises ontologies on horizontal levels and ontologies on different levels, and said specified criteria selectively comprises either metadata associated with said multimedia artifact, ontology scores derived for each ontology in the plurality of ontologies that pertains to content information of said multimedia artifact.

13. The computer program product of claim 11, wherein:
said evaluation using said selected classes enriches said multimedia artifact with said new semantic metadata, wherein said new semantic metadata is stored in a specified database, or packaged with said multimedia artifact, selectively.

14. The computer program product of claim 12, wherein:
said ontology scores and class scores are each derived by analyzing context information related to said multimedia artifact, wherein said context information includes at least one element selected from a group of elements comprising time, place, content provider, person, event, object, scene and content acquisition parameters.

15. The computer program product of claim 11, wherein:
said evaluating step comprises using said selected classes to detect the presence or absence of specified semantic elements that characterize said multimedia artifact.

16. The computer program product of claim 15, wherein:
said selected classes are used in the automatic classification procedure that uses a method selected from a group of methods that includes at least neural networks, decision trees, Gaussian mixture models, hidden Markov models, and support vector machines.

17. The computer program product of claim 11, wherein:
a recursive router is used with said multimedia artifact, to derive ontology scores and class scores, and to select the at least one ontology from the ontology database based on the ontology scores and relationship branches between ontologies and to select said selected classes from a class database based on the class scores and relationships branches between the semantic elements of the at least one ontology.

18. The computer program product of claim 17, wherein:
said recursive router supplies said multimedia artifact with enriched metadata.

19. The computer program product of claim 11, wherein:
the plurality of ontologies are scored and the at least one ontology is selected based on the number of semantic elements in the at least one ontology that are found to be relevant to said multimedia artifact.

20. The computer program product of claim 19, wherein:
the relevance of the plurality of ontologies is determined by respectively selecting one or more semantic elements from the plurality of ontologies, and applying corresponding classes of the one or more semantic elements to said multimedia artifact.

21. An apparatus for classifying a multimedia artifact comprising:
a computer processor coupled to a memory, wherein the computer processor comprises a specified processing component for applying a recursive routing selection technique to select said multimedia artifact as an input data object in digital form that is mapped by particular semantic classes which belong to a specific ontology and to a specific domain, said specified processing component including a first processing component, a second processing component, a third processing component and a fourth processing component;
said first processing component for using specified criteria including an HTML address, an alt tag and a date-time limitation, to select at least one ontology from a plurality of ontology stored in an ontology database in the memory, wherein each ontology in the plurality of ontology includes an associated domain that is limited to said input data object, specified domain characteristics, and semantic classes, wherein said specified criteria indicates a comparative similarity between specified characteristics of said multimedia artifact and the specified domain characteristics of each ontology in the plurality of ontology;
said second processing component for scoring and selecting one or more classes from a plurality of classes to form selected classes that respectively correspond to the semantic classes of the selected ontology;
said third processing component for evaluating said multimedia artifact using said selected classes to determine a classification for said multimedia artifact, wherein automatic classification and tagging procedures are executed, and said third processing component compares content and semantic metadata of said multimedia artifact with each of the selected classes of each ontology of the selected ontology, and is responsive to frequent concurrence of high level concepts which are used to derive a downward leaf object searching schema for suboptimal choice of the most appropriate concept to evaluate against said multimedia artifact, which results in recursively capturing new semantic metadata for refining said metadata of said multimedia artifact and rendering a new classification for said multimedia artifact; and
said fourth processing component for stopping recursive routing when a pre-specified suboptimal downward leaf object searching schema is reached in said ontology database.

22. The apparatus of claim 21, wherein:
said first component uses said specified criteria is used to select the at least one ontologies from the plurality ontologies located in a data structure, wherein the data structure comprises ontologies on horizontal levels and ontologies on different levels, and said specified criteria selectively comprises either metadata associated with said multimedia artifact, or ontology scores derived for each ontology in the plurality of ontologies that pertains to content information of said multimedia artifact.

23. The apparatus of claim 21, wherein:
said third component performs said evaluation using said selected classes to enrich said multimedia artifact with said new semantic metadata, wherein said new semantic metadata is stored in a specified database, or packaged with said multimedia artifact, selectively.

24. The apparatus of claim 23, wherein:
said ontology scores and class scores are each derived by analyzing context information related to said multimedia artifact, wherein said context information includes at least one element selected from a group of elements comprising time, place, content provider, person, event, object, scene and content acquisition parameters.

25. The apparatus of claim 21, wherein:
said third component uses said selected classes to detect the presence or absence of specified semantic elements that characterize said multimedia artifact.

26. The apparatus of claim 25, wherein:
said selected classes are used in the automatic classification procedure that uses a method selected from a group of methods that includes at least neural networks, decision trees, Gaussian mixture models, hidden Markov models, and support vector machines.

27. The apparatus of claim 21, wherein:
a recursive router is used with said multimedia artifact, to derive ontology scores and class scores, and to select the at least one ontology from the ontology database based on the ontology scores and relationship branches between ontologies and to select said selected classes from a class database based on the class scores and relationships branches between the semantic elements of the at least one ontology.

28. The apparatus of claim 27, wherein:
said recursive router supplies said multimedia artifact with enriched metadata.

29. The apparatus of claim 21, wherein:
the plurality of ontologies are scored and the at least one ontology is selected based on the number of semantic elements in the at least one ontology that are found to be relevant to said multimedia artifact.

30. The apparatus of claim 29, wherein:
the relevance of the plurality of ontologies is determined by respectively selecting one or more semantic elements from the plurality of ontologies, and applying corresponding classes of the one or more semantic elements to said multimedia artifact.

* * * * *